J. H. DOZIER.
BELT FASTENER.
APPLICATION FILED FEB. 16, 1912.

1,042,206.

Patented Oct. 22, 1912.

Witnesses
Frank Hough
L. O. Parker

Inventor
J. H. Dozier,
By Victor J. Evans
Attorney

UNITED STATES PATENT OFFICE.

JAMES H. DOZIER, OF ST. PETERSBURG, FLORIDA, ASSIGNOR OF ONE-HALF TO DANIEL A. LAWSON, OF ST. PETERSBURG, FLORIDA.

BELT-FASTENER.

1,042,206.     Specification of Letters Patent.     Patented Oct. 22, 1912.

Application filed February 16, 1912. Serial No. 677,920.

*To all whom it may concern:*

Be it known that I, JAMES H. DOZIER, a citizen of the United States, residing at St. Petersburg, in the county of Pinellas and State of Florida, have invented new and useful Improvements in Belt-Fasteners, of which the following is a specification.

The invention relates to belt couplings and more particularly to the class of belt fasteners.

The primary object of the invention is the provision of a belt fastener in which a hinge is interposed between the meeting ends of the belt, and securely fastened thereto for the joining of said ends without the use of rivets, screws, or other fasteners, thus avoiding the weakening of the belt or the possibility of the separation of the ends thereof.

Another object of the invention is the provision of a fastener of this character in which there is arranged a pair of hinged sections having prongs which may be bent for the clenching of the same in the meeting ends of a belt to join the same, the prongs when clenched being designed to lie close to the face of the belt adjacent thereto thereby avoiding protuberances on the belt.

A further object of the invention is the provision of a belt fastener which is simple in construction, strong, durable, readily and easily applied to the belt ends, and that is inexpensive in manufacture.

With these and other objects in view the invention consists in the construction, combination and arrangement of parts as will be hereinafter more fully described, illustrated in the accompanying drawings and pointed out in the claim hereunto appended.

Figure 1:
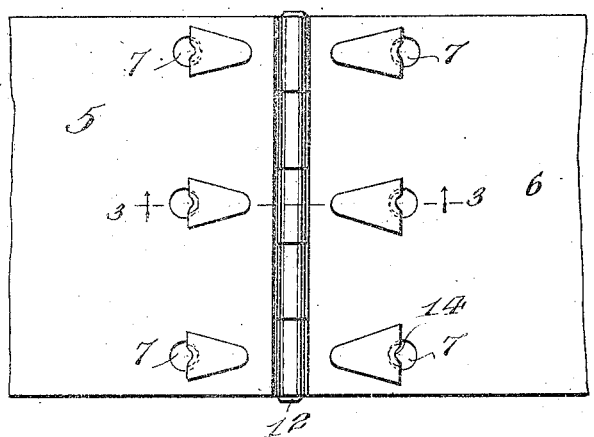
Figure 2:
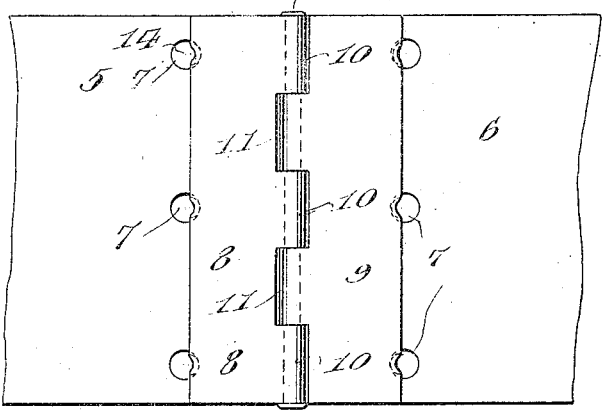
Figure 4:
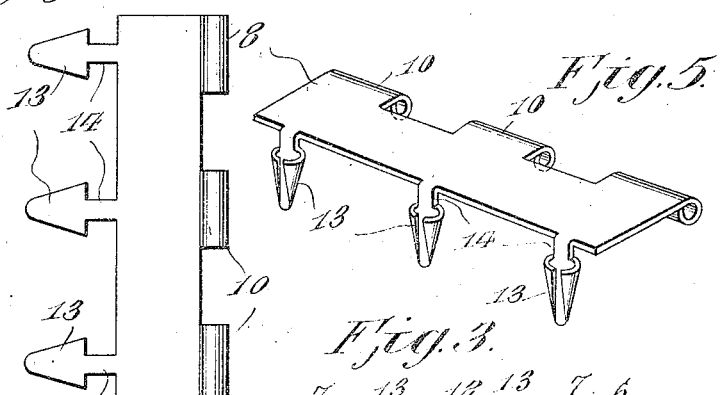
Figure 5:
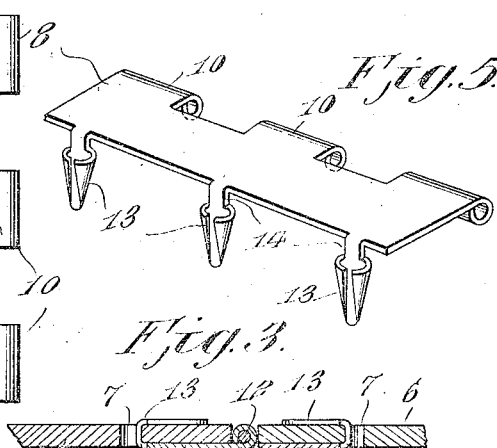
Figure 3:

In the drawings:—Figure 1 is a fragmentary top plan view of the meeting ends of the belt showing the fastener constructed in accordance with the invention applied thereto. Fig. 2 is a similar view looking toward the inner sides of the belt ends. Fig. 3 is a sectional view on the line 3—3 of Fig. 1. Fig. 4 is a plan view of the fastener prior to its connection to the belt ends. Fig. 5 is a perspective view of the fastener when the tongues have been bent for free insertion in the belt ends.

Similar reference characters indicate corresponding parts throughout the several views in the drawing.

Referring to the drawings by numerals 5 and 6 designate respectively the meeting ends of a belt, the same being of the ordinary well-known construction although it may be of any desired thickness and width, the said ends being formed with apertures 7 arranged in rows transversely thereof. The apertures are spaced from each other and are designed to permit the ready and easy fastening of the belt coupling or fastener to the ends for the joining of the same.

The belt fastener comprises complementary-shaped sections 8 and 9 one of which is formed with three pintle loops 10 and the other has two pintle loops 11. A greater or lesser number of pintle loops may be used on the sections 8 and 9 provided they correspond. A removable pintle 12 extends through all of the pintle loops and thus hinges the two sections 8 and 9 of the fastener together, making a joint which suitably flexes when the belt is running around the pulley. Each section 8 or 9 has formed thereon substantially triangular-shaped bendable tongues 13 forming clenching prongs, same being joined thereto by means of contracted inner ends 14 and are adapted to be out-turned at their side edges so as to pass freely through the apertures 7 in the belt ends and thereafter clench against the latter as shown in Fig. 2 of the drawing so as to lie flat and in close relation to the faces of the ends adjacent thereto, thus avoiding protuberances upon the inner sides of the belt. Thus when the fastener is secured to the belt ends it will firmly join the same yet permitting flexing of the belt when passing around the pulley. It will be apparent that when the tongues have been clenched in a manner as hereinbefore stated the triangular formation of said tongues will prevent the same from being pulled out of the apertures 7 in the said belt end thereby avoiding the separation of the same.

From the foregoing it is thought that the construction and manner of application of the invention will be clearly understood and therefore, a more extended explanation is omitted.

What is claimed is:—

A belt fastener comprising a pair of sections having pintle loops, a pintle removably passed through said loops for hinging the sections, and normally curled outwardly tapering prongs formed on the outer edges of said sections and at right angles thereto and adapted to be passed through apertures in the meeting ends of a belt and subsequently flattened against the faces of said ends opposite the points of contact of the sections therewith for the locking of the sections to the belt.

In testimony whereof I have affixed my signature in presence of two witnesses.

JAMES $\overset{\text{his}}{\times}$ H. DOZIER.
mark

Witnesses:
 CHARLES DURANT,
 DANIEL A. LAWSON.